(12) United States Patent
Robichaud

(10) Patent No.: US 10,139,851 B2
(45) Date of Patent: Nov. 27, 2018

(54) RADIO DECORATION SYSTEM

(71) Applicant: Joseph Robichaud, Hamilton (CA)

(72) Inventor: Joseph Robichaud, Hamilton (CA)

(*) Notice: Subject to any disclaimer, the term of this patent is extended or adjusted under 35 U.S.C. 154(b) by 0 days.

(21) Appl. No.: 15/442,030

(22) Filed: Feb. 24, 2017

(65) Prior Publication Data

US 2018/0246539 A1  Aug. 30, 2018

(51) Int. Cl.
| | | |
|---|---|---|
| G05G 1/10 | (2006.01) | |
| G09F 21/04 | (2006.01) | |
| G09F 23/00 | (2006.01) | |
| B60R 13/00 | (2006.01) | |

(52) U.S. Cl.
CPC ............... *G05G 1/10* (2013.01); *B60R 13/00* (2013.01); *G09F 21/04* (2013.01); *G09F 23/00* (2013.01); *G05G 1/105* (2013.01)

(58) Field of Classification Search
CPC ........... G01G 1/10; G01G 1/105; B60R 13/00
USPC .......................................................... 428/28
See application file for complete search history.

(56) References Cited

U.S. PATENT DOCUMENTS

| | | | | |
|---|---|---|---|---|
| RE17,017 E | * | 7/1928 | Buchholz ................ | H03J 1/044 |
| | | | | 116/257 |
| 5,008,551 A | * | 4/1991 | Randolph ............. | E05B 17/106 |
| | | | | 16/414 |
| D317,890 S | * | 7/1991 | Bachmann ................... | D12/162 |
| D354,371 S | | 1/1995 | Wood | |
| 5,549,940 A | | 8/1996 | Noone | |
| D381,897 S | | 8/1997 | Matthiesen | |
| D385,482 S | | 10/1997 | Bried et al. | |
| 5,701,635 A | | 12/1997 | Hawkes | |
| 5,836,261 A | | 11/1998 | Sutton | |
| D402,599 S | * | 12/1998 | Adelaar ....................... | D12/162 |
| D421,441 S | | 3/2000 | Aanenson | |
| 6,224,221 B1 | * | 5/2001 | Glienicke ............ | G02B 6/0033 |
| | | | | 116/286 |
| D462,905 S | | 9/2002 | Siegel et al. | |
| D477,260 S | * | 7/2003 | Hovren ........................ | D12/202 |
| 2008/0283682 A1 | * | 11/2008 | Harrington ......... | B60R 11/0205 |
| | | | | 248/27.3 |
| 2013/0229783 A1 | * | 9/2013 | Fendeleur .............. | B60K 37/06 |
| | | | | 362/23.04 |
| 2014/0226318 A1 | * | 8/2014 | Brennan ................... | F21S 9/02 |
| | | | | 362/191 |

* cited by examiner

*Primary Examiner* — Humera N Sheikh
*Assistant Examiner* — Julia L Rummel

(57) ABSTRACT

A radio decoration system for enhancing an ornamental appearance of a radio includes a vehicle and a radio that is coupled to the vehicle. The radio has a plurality of knobs and each of the knobs is selectively manipulated. A plurality of covers is provided and each of the covers is removably coupled to an associated one of the knobs. Each of the covers is structured to have an ornamental appearance of athletic equipment.

4 Claims, 2 Drawing Sheets

RADIO DECORATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to decoration devices and more particularly pertains to a new decoration device for enhancing an ornamental appearance of a radio.

BRIEF SUMMARY OF THE INVENTION

An embodiment of the disclosure meets the needs presented above by generally comprising a vehicle and a radio that is coupled to the vehicle. The radio has a plurality of knobs and each of the knobs is selectively manipulated. A plurality of covers is provided and each of the covers is removably coupled to an associated one of the knobs. Each of the covers is structured to have an ornamental appearance of athletic equipment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
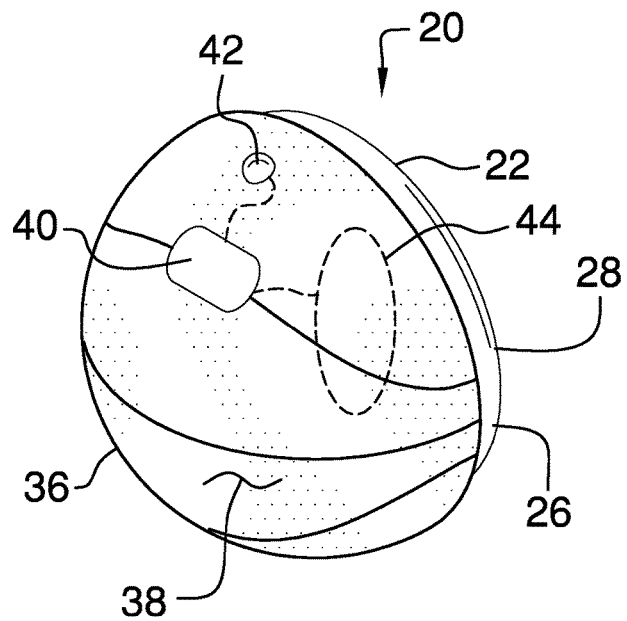
FIG. 1 is a perspective view of a cover of a radio decoration system according to an embodiment of the disclosure.
Figure 2:
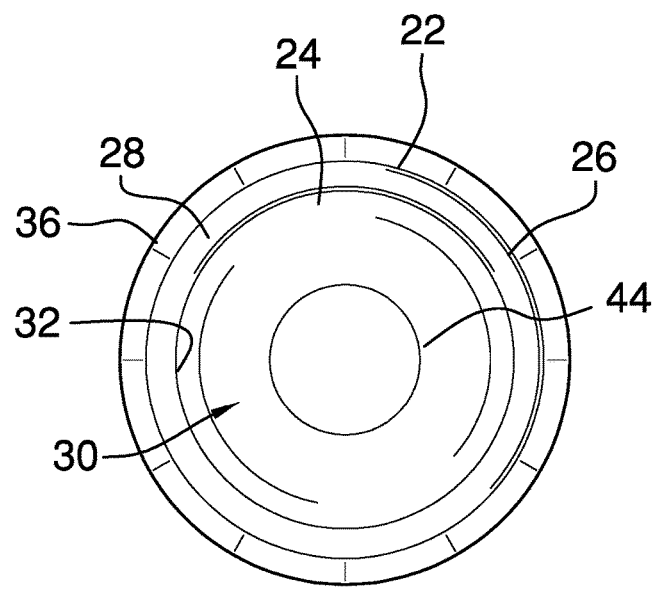
FIG. 2 is a back view of cover of an embodiment of the disclosure.
Figure 3:
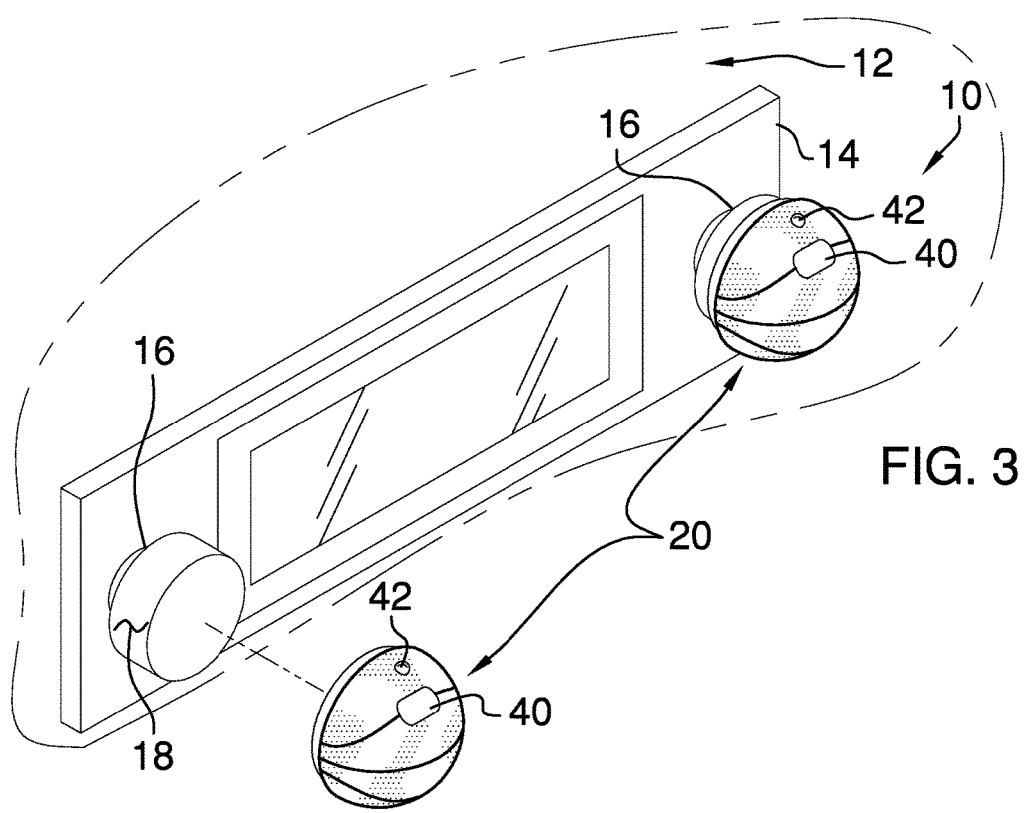
FIG. 3 is a perspective in-use view of an embodiment of the disclosure.
Figure 4:
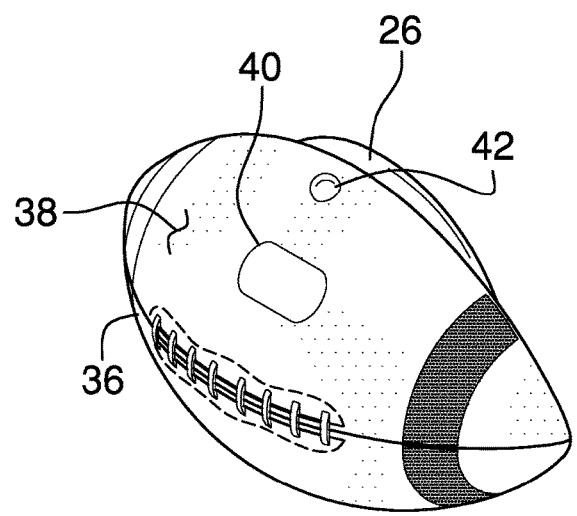
FIG. 4 is a front perspective view of an embodiment of the disclosure.

With reference now to the drawings, and in particular to FIGS. 1 through 4 thereof, a new decoration device embodying the principles and concepts of an embodiment of the disclosure and generally designated by the reference numeral 10 will be described.

As best illustrated in FIGS. 1 through 4, the radio decoration system 10 generally comprises a vehicle 12. The vehicle 12 may be a passenger vehicle, a boat, a commercial vehicle or any other type of motorized vehicle. A radio 14 is provided and the radio 14 is coupled to the vehicle 12. The radio 14 has a plurality of knobs 16 and each of the knobs 16 is selectively manipulated to control operational parameters of the radio 14. Each of the knobs 16 has a perimeter surface 18. Moreover, the radio 14 may be an AM/FM radio 14, a CD player or any other type of electronic radio commonly employed in a vehicle 12.

A plurality of covers 20 is provided and each of the covers 20 is removably coupled to an associated one of the knobs 16. Each of the covers 20 is structured to have an ornamental appearance of athletic equipment. The athletic equipment may include, but not be limited to, a basketball, a football, a baseball or any other type of athletic equipment.

Each of the covers 20 comprises a cup 22 that has a basal wall 24 and a peripheral wall 26 extending away from the basal wall 24. The peripheral wall 26 is continuous such that the cup 22 has a cylindrical shape. The peripheral wall 26 has a distal edge 28 with respect to the basal wall 24 and the distal edge 28 defines an opening 30 into the cup 22. The peripheral wall 26 has an inner surface 32 and the basal wall 24 has an outwardly facing surface 34.

The cup 22 may be comprised of a resiliently stretchable material such as rubber or the lie. The cup 22 insertably receives an associated one of the knobs 16 and the inner surface 32 of the cup 22 frictionally engages the perimeter surface 18 of the associated knob. In this way the cup 22 is removably retained on the associated knob 16.

An ornament 36 is coupled to the outwardly facing surface 34 of the cup 22 and the ornament 36 may be manipulated to control the operational parameters of the radio 14. The ornament 36 has an outward surface 38. Moreover, the outward surface 38 is structured to resemble the athletic equipment. In this way the ornament 36 enhances an ornamental appearance of the associated knob 16.

A light emitter 40 is coupled to outward surface 38 of the ornament 36 and the light emitter 40 selectively emits light outwardly therefrom. The light emitter 40 is structured to have the ornamental appearance of a team logo. Moreover, the team logo may be a logo for a selected football team, a selected basketball team or any other professional or semi professional sports organization. The light emitter 40 may include at least one LED.

A button 42 is coupled to the outward surface 38 of the ornament 36 and the button 42 is selectively manipulated. The button 38 is electrically coupled to the light emitter 40 to turn the light emitter 40 on and off. A power supply 44 is positioned in the cup 22 and the power supply 44 is electrically coupled to the button 42. The power supply 44 comprises at least one battery and the at least one battery may be a watch battery or the like.

In use, the cup 22 corresponding to each of the covers 20 is urged onto an associated one of the knobs 16. The peripheral wall 26 of the cup 22 frictionally engages the associated knob 16 to removably retain the cup 22 on the associated knob 16. The ornament 36 corresponding to each of said covers 20 is manipulated to control the operational parameters of the radio 14. Moreover, the ornament 36 enhances the ornamental appearance of the associated knob 16 to convey enthusiasm for a particular sport and a particular athletic team. The button 42 is selectively manipulated to turn the light emitter 40 on and off.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A radio decoration system comprising:
a vehicle;
a radio being coupled to said vehicle, said radio having a plurality of knobs wherein each of said knobs is configured to be manipulated; and
a plurality of covers, each of said covers being removably coupled to an associated one of said knobs, each of said covers being structured to have an ornamental appearance of athletic equipment, each of said covers comprising a cup having an outwardly facing surface; and
an ornament being coupled to said outwardly facing surface of said cup wherein said ornament is configured to be manipulated, said ornament having an outward surface, said outward surface being structured to resemble the athletic equipment wherein said ornament is configured to change an appearance of an associated one of said knobs;
a light emitter being coupled to said outward surface of said ornament; and
a button positioned on said outward surface of said ornament, said button being electrically coupled to said light emitter for turning said light emitter on and off.

2. The system according to claim 1, wherein:
each of said knobs has a perimeter surface; and
each said cup having a basal wall and a peripheral wall extending away from said basal wall, said peripheral wall being continuous such that said cup has a cylindrical shape, said peripheral wall having a distal edge with respect to said basal wall, said distal edge defining an opening into said cup, said peripheral wall having an inner surface, said basal wall having an outwardly facing surface.

3. The system according to claim 2, wherein said cup insertably receives an associated one of said knobs such that said inner surface of said cup frictionally engages said perimeter surface of said associated knob such that said cup is removably retained on said associated knob.

4. A radio decoration system comprising:
a vehicle;
a radio being coupled to said vehicle, said radio having a plurality of knobs wherein each of said knobs is configured to be manipulated, each of said knobs controlling operational parameters of said radio, each of said knobs having a perimeter surface; and
a plurality of covers, each of said covers being removably coupled to an associated one of said knobs, each of said covers being structured to have an ornamental appearance of athletic equipment, each of said covers comprising:
a cup having a basal wall and a peripheral wall extending away from said basal wall, said peripheral wall being continuous such that said cup has a cylindrical shape, peripheral wall having a distal edge with respect to said basal wall, said distal edge defining an opening into said cup, said peripheral wall having an inner surface, said basal wall having an outwardly facing surface, said cup insertably receiving an associated one of said knobs such that said inner surface of said cup frictionally engages said perimeter surface of said associated knob such that said cup is removably retained on said associated knob, and
an ornament being coupled to said outwardly facing surface of said cup wherein said ornament is configured to be manipulated, said ornament having an outward surface, said outward surface being structured to resemble the athletic equipment wherein said ornament is configured to change an appearance of said associated knob,
a light emitter being coupled to said outward surface of said ornament, and
a button positioned on said outward surface of said ornament, said button being electrically coupled to said light emitter for turning said light emitter on and off.

* * * * *